Figure 4:
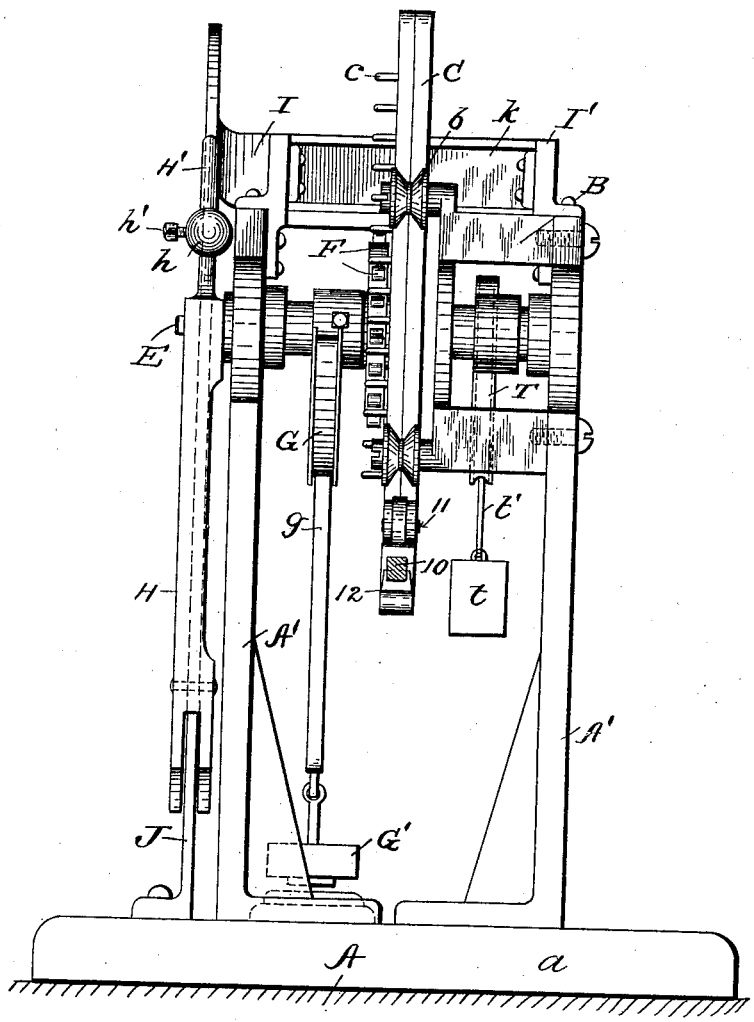

No. 628,559. Patented July 11, 1899.
J. H. STEPHENS.
COMBINED COMPUTING DEVICE AND WEIGHING SCALE.
(Application filed Jan. 6, 1898.)
(No Model.) 5 Sheets—Sheet 1.
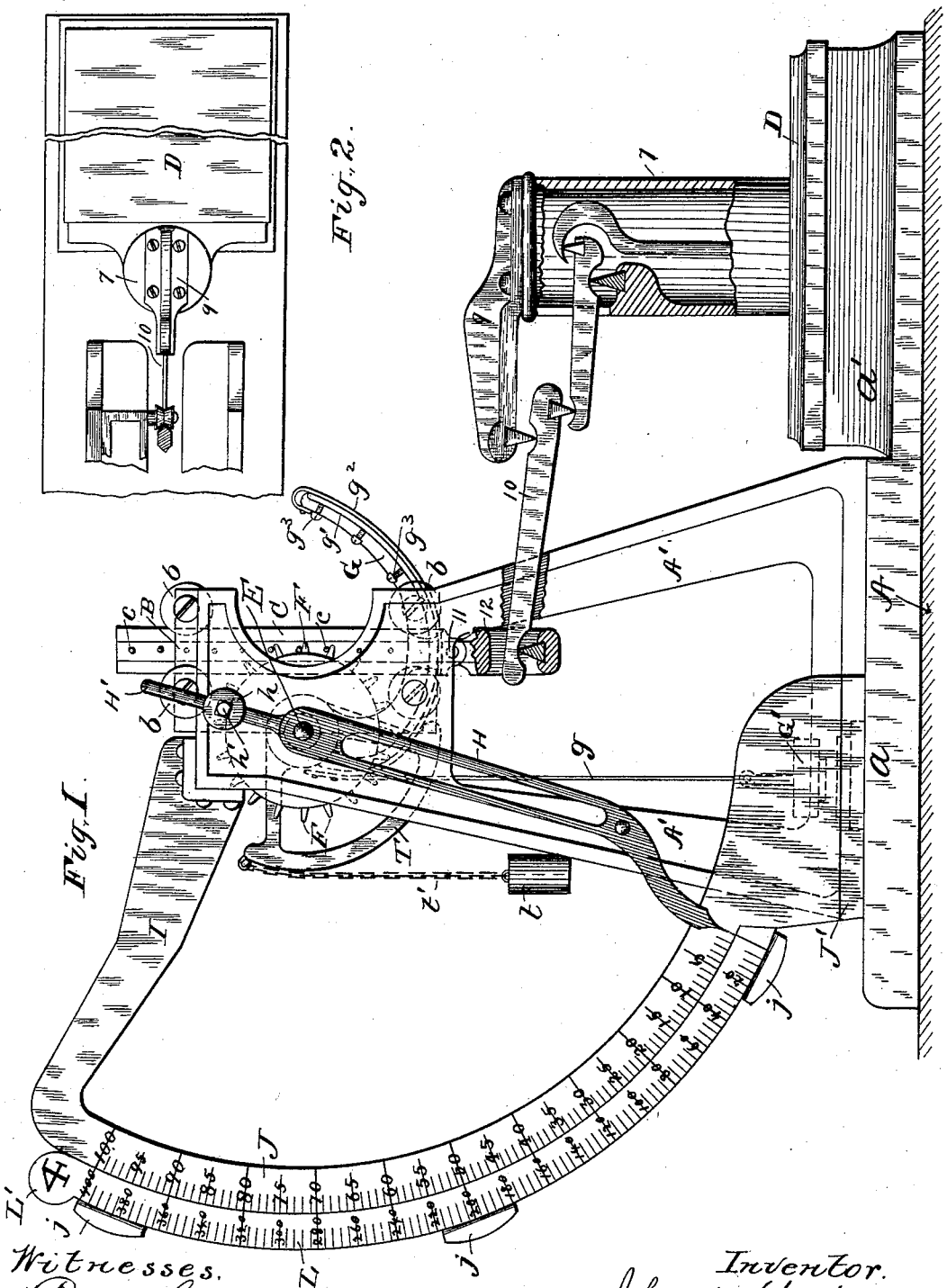
Witnesses. Inventor.
John H. Stephens.
per Albert D. Shrewsbury
Atty.
THE NORRIS PETERS CO., PHOTO-LITHO., WASHINGTON, D. C.

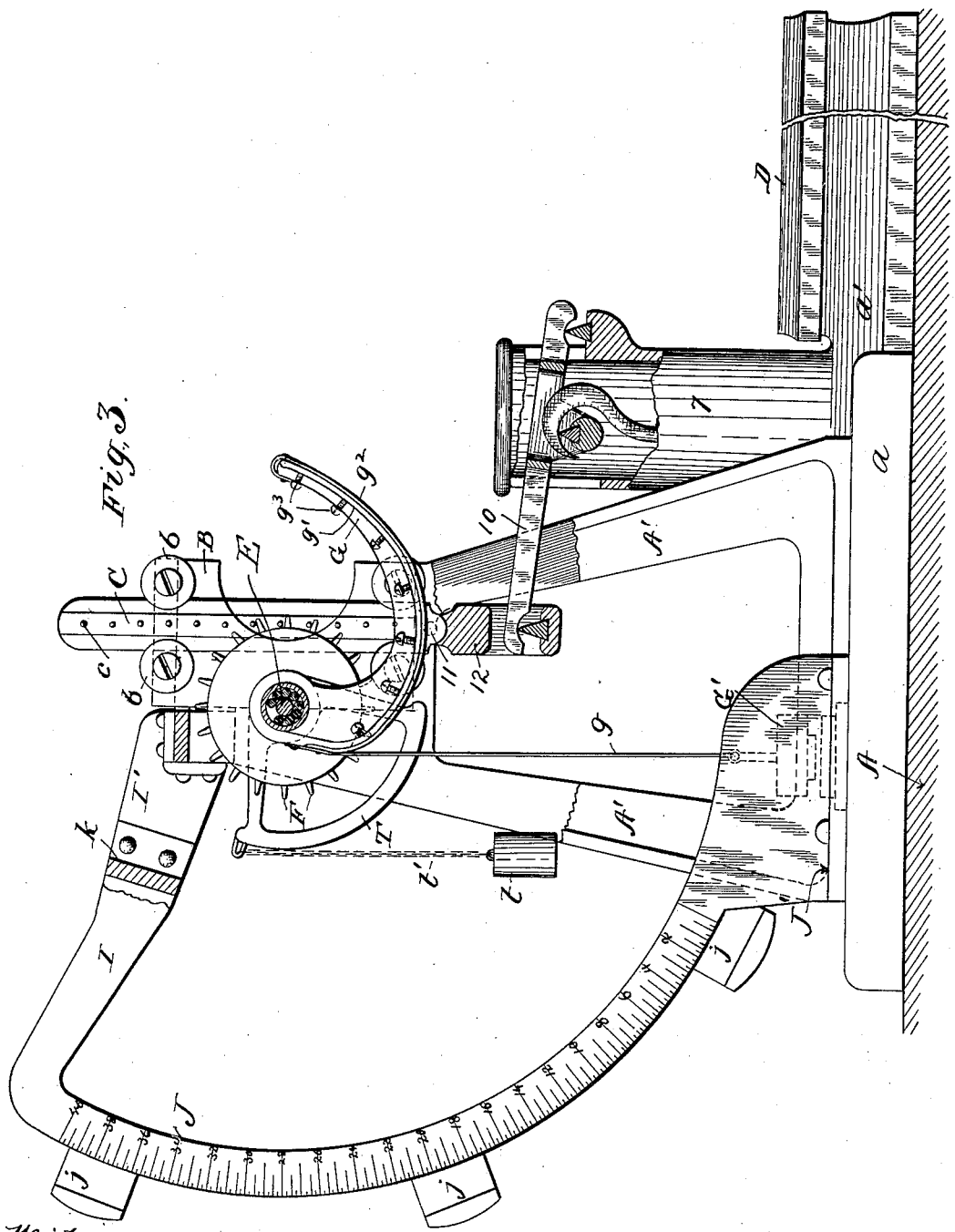

No. 628,559. Patented July 11, 1899.
J. H. STEPHENS.
COMBINED COMPUTING DEVICE AND WEIGHING SCALE.
(Application filed Jan. 6, 1898.)
(No Model.) 5 Sheets—Sheet 4.

Witnesses.

Inventor.
John H. Stephens
per Albert D. Shrewsbury
Atty

No. 628,559. Patented July 11, 1899.
J. H. STEPHENS.
COMBINED COMPUTING DEVICE AND WEIGHING SCALE.
(Application filed Jan. 6, 1898.)
(No Model.) 5 Sheets—Sheet 5.

Witnesses.

Inventor
John H. Stephens.
per Albert D. Shrewsbury
atty

UNITED STATES PATENT OFFICE.

JOHN H. STEPHENS, OF VERNON, TEXAS.

COMBINED COMPUTING DEVICE AND WEIGHING-SCALE.

SPECIFICATION forming part of Letters Patent No. 628,559, dated July 11, 1899.

Application filed January 6, 1898. Serial No. 665,789. (No model.)

*To all whom it may concern:*

Be it known that I, JOHN H. STEPHENS, a citizen of the United States, residing at Vernon, in the county of Wilbarger and State of Texas, have invented certain new and useful Improvements in a Combined Computing Device and Weighing-Scale; and I do hereby declare the following to be a full, clear, and exact description of the invention, such as will enable others skilled in the art to which it appertains to make and use the same.

My invention has reference to improvements in computing devices in combination with weighing-scales; and it consists of certain novel features of construction which will be hereinafter fully described in the specification, illustrated in the drawings, and pointed out in the claims.

The object of the present invention is to construct a simple, economical, and portable combined computing and weighing scale for ordinary use so simple in its operation that an illiterate person can manipulate it with as much facility as one trained to the practical use of more complicated devices.

A further object of the invention is to provide interchangeable strips of metal or any other desirable material having marked thereon a price-scale to correspond to and to register with the pound-marks on the scale-arc; also, to have indicated on these portable strips the price per pound for all commodities sold by a person having one of my improved computing and weighing devices.

A further object of my invention is to provide an arc of increasing radius for a weighing-scale in combination with a computing device, said arc resembling somewhat in contour a logarithmic curve. By this means I obviate the necessity of providing additional weights on a counterpoise when weighing.

A further object of the present invention is to employ a spur-wheel for suspending the weighing-post, which is provided with a suitable rack for engagement with the spur or toothed wheel.

A further object of the invention is to employ a modified counterbalance, consisting of a rack suspended on the opposite side of the spur-wheel, which meshes with the weighing-post rack.

A further object of my invention is to so modify the combined computing and weighing device that it can be suspended for store purposes, but more especially for out-of-door work, where it may be necessary to weigh bales of hay, farm products, and the like.

A further object of my invention is to so construct and arrange the rack or post with a knuckle-joint near its lowermost end, which is provided with a knife-edge for engagement with a lever connected to a weighing-scale.

A further object of my invention is to locate the weighing-platform on or near the same level with the computing-platform.

To more fully elucidate my invention, I will proceed to describe the drawings, in which—

Figure 5:
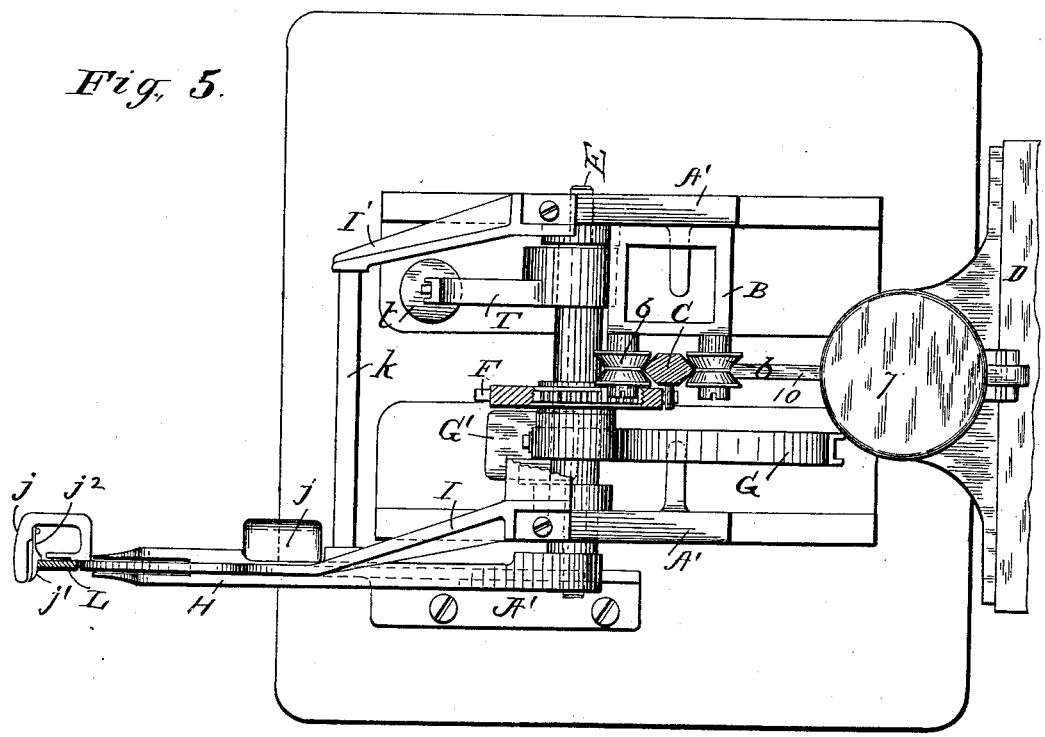
Figure 6:
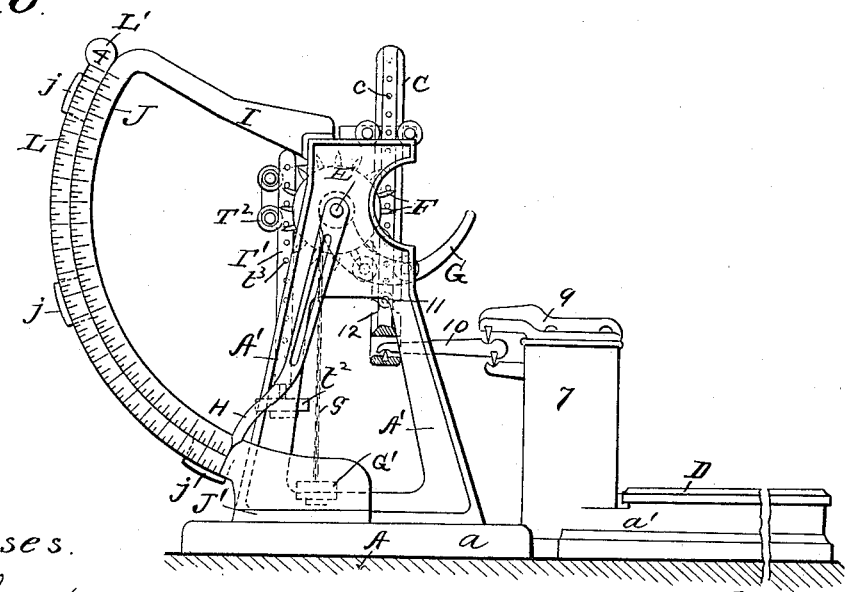
Figure 7:
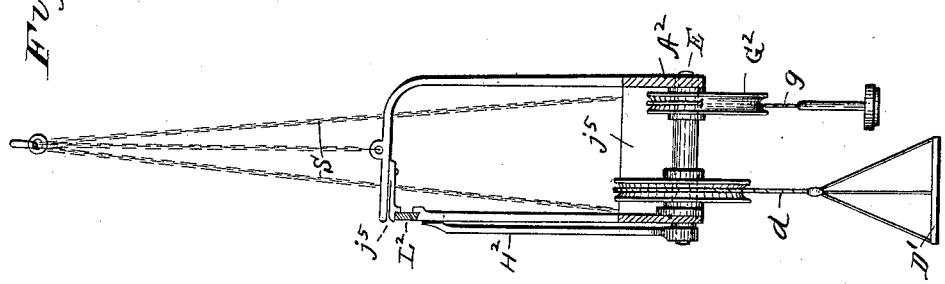
Figure 8:
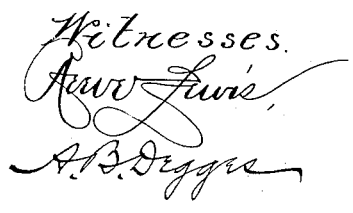

Figure 1 is a side elevation of my improved computing and weighing device, some of the parts being broken away and shown in section. Fig. 2 is a detail in plan view on a reduced scale. Fig. 3 is also a side elevation of my improved device, being broken away and shown in section and the computing strip or arc removed. Fig. 4 is a rear elevation of my improved device with the scales removed. Fig. 5 is a plan or top view of the device with only a portion of the scales shown. Fig. 6 is a view similar to Fig. 1, but showing a modified form of counterbalance. Fig. 7 is a side elevation of my device with the arcs extended and shown in a suspended form. Fig. 8 is a front elevation of the suspended device.

My invention consists of a base A for supporting the weighing and computing device. The device is also provided with supplemental bases $a$ and $a'$, respectively. Secured to base $a$ are standards A' for supporting the general weighing mechanism. Secured to the upper portion of said standards A' is a bracket B, which supports friction-rollers $b$ $b$, &c., for keeping in alinement and allowing a reciprocating movement to a post C. Said post C has an extension 12 at its lowermost end, which is jointed at 11 and which is provided with a knife-edge bearing for supporting the free end of a lever 10, which will be hereinafter more fully set forth.

Located in standards A' are roller-bearings for retaining in position shaft E, said shaft supporting a spur gear-wheel F, which meshes into the rack formed by pins $c$, located in post C, previously referred to. Mounted immediately in front and adjacent to said gear-wheel is arc of increasing radius G, which is provided with a strap $g$ and a suitable weight G'. Said strap may be of any suitable material, but flexible steel is preferable for this purpose. Said adjustable increasing arc G is provided with flanges $g'$ on its opposite sides (only one side being shown in the drawings) for seating an adjustable steel strap $g^2$, which fits closely to the curved face of said arc G. Said flanges $g'$ are tapped at intervals for receiving set-screws $g^3$ for extending or contracting the steel strip $g^2$, as occasion may require, to regulate said arc, so that the index-hand H will accord or register with the pound-marks on the arc J. Located on the same shaft is a counterbalancing-arc T, which is of equal radius throughout and which is provided with a weight $t$ and chain $t'$. Said weight $t$ is to balance the post C, platform D, and the various parts pertaining thereto, and also to keep the weighing index-hand H at zero when said platform D is not loaded with any commodity. On the forward end of said shaft E is a duplex index-hand H, which is provided with a tail end H' and an adjustable ball $h$, the latter being provided with a set-screw $h'$, so as to adjust said ball to exactly balance said hand. By this means said hand can describe any number of degrees of arc above ninety degrees without adding or subtracting from the commodity to be weighed. Mounted on the base A and the standards A' by means of arms I and I' is a graduated arc J, having a base J', which has indicated on its front and rear faces the pounds and fractions thereof. Said arc is held in a rigid position by a brace K, extending from arms I and I', respectively.

Secured to the graduated arc J are spring-actuating supports $j$ for receiving the graduated price-strips L, which have indicated thereon the price of the commodity at a certain rate per pound. These strips will give the sum total of any pounds indicated on the scale-arc J by means of the duplex index-hand H. For instance, if the duplex-hand H would indicate seven pounds at four cents per pound the computing-arc L would indicate twenty-eight cents exactly opposite said seven pounds, as can be readily understood by observing Fig. 1 of the accompanying drawings.

In Fig. 3 the computing-arc L has been removed to exhibit the arc-supports $j$.

In Fig. 5 the spring-actuating device is fully illustrated. The computing-arc L is shown in section, the outside edge of which rests against the spring-catch $j'$, which is provided rearwardly with a shoulder, so as to hold said computing-arc in position, the tension of the spring portion $j^2$ of said catch $j'$ being sufficient through frictional contact to prevent said arc L from becoming detached. When desirable to remove one computing-arc and substitute another at a different price per pound, the weigher by putting two fingers on opposite side of the middle catch $j$ and behind said computing-arc can readily remove it by a quick or spasmodic jerk or a continuous pull. A number of these computing-strips L are employed with the price per pound marked in large figures at the top of each strip, as shown in the various figures, this part of the computing-strip being an arc of a circle, as indicated at L'.

The friction-roller frame B is secured by bolts to the rear standard A', the friction-rollers $b$ overhanging, thus making it more accessible when desiring to examine or lubricate any of the moving parts of my improved device.

It is preferable in this device to place the weighing-scales proper nearly on a level with the base $a$, as it is more convenient than having it located on post C, as indicated in my previous applications. This device is operated by levers having knife-edge bearings, the platform or base $a'$ supporting a post 7, which is provided with an overhanging arm 9 and a knife-edge bearing for fulcruming a lever 10, previously referred to. The levers communicating from the scale proper to the post C can be either single or compounded, as occasion may require.

In Fig. 6 the counterbalance consists of a suspended rack T', provided with pins $t^3$ and a weight $t^2$ and held in position by friction-rollers $T^2$, which are mounted in a suitable frame bolted to the standards A'.

Referring to Figs. 7 and 8, which show my device in a somewhat modified form, it being suspended by chains S by the arc-supports $j^5$, the arcs $L^2$ and $J^2$, respectively, being one hundred and eighty degrees, so as to be self-balancing, $L^3$ indicates the distinguishing pound-mark, as these arc-strips $L^2$ are removable, similar to those indicated in the previous figures.

The weighing-platform D' is suspended by a chain or cord $d$. The increasing arc $G^2$ is provided with a weight and chain $g$ for operating the index-hand $H^2$. This device is provided with a rear overhanging frame $A^2$ for balancing the scales through the medium of the chains S, previously referred to.

Having described my invention, that which I desire to secure by Letters Patent of the United States is—

1. A pendulum-scale provided with an arc of increasing radius, a toothed wheel on the arc-shaft, of a rack in combination with levers bearing knife-edges connected to a platform-scale, and a pound-arm, and interchangeable computing-strips, for ascertaining the amount weighed and price thereof, through the medium of a pointer as specified.

2. A platform-scale in combination with levers connecting to a pendulum-scale, through the medium of a rack, toothed wheel, arc of increasing radius and weight thereon, for ascertaining the weight and price of any commodity, by means of a pointer as specified.

3. In a weighing-scale provided with an arc of increasing radius, a toothed wheel having a counterbalancing-rack, and weighing-post operating said arc, a shaft supporting said toothed wheel and arc, and an index-hand on the free end of said shaft for indicating the number of pounds weighed, in combination with spring-actuating supports and interchangeable price-strips having the price per pound on said strips for each commodity weighed, substantially as described.

4. In combination with a platform-scale, a rack held in vertical alinement by rollers, and operating a pendulum-scale through the medium of a rack-wheel and an arc of increasing radius for ascertaining the amount and price thereof, through a pointer as specified.

In testimony whereof I affix my signature in presence of two witnesses.

JOHN H. STEPHENS.

Witnesses:
 REEVE LEWIS,
 W. REES EDELEN.